United States Patent
Gallego et al.

(10) Patent No.: US 6,729,635 B2
(45) Date of Patent: May 4, 2004

(54) FIFTH WHEEL

(75) Inventors: Jose Alguera Gallego, Aschaffenburg (DE); Fan Zhang, Raunheim (DE)

(73) Assignee: Jost - Werke GmbH & Co. KG, Frankfurt (DE)

(*) Notice: Subject to any disclaimer, the term of this patent is extended or adjusted under 35 U.S.C. 154(b) by 0 days.

(21) Appl. No.: 10/382,064

(22) Filed: Mar. 5, 2003

(65) Prior Publication Data

US 2003/0184047 A1 Oct. 2, 2003

(30) Foreign Application Priority Data

Mar. 23, 2002 (DE) .......................... 102 13 148

(51) Int. Cl.⁷ .............................................. B62D 53/08
(52) U.S. Cl. ..................... 280/438.1; 280/440
(58) Field of Search ...................... 280/439, 438.1, 280/440, 441.1, 433

(56) References Cited

U.S. PATENT DOCUMENTS

| | | | | |
|---|---|---|---|---|
| 2,784,009 A | * | 3/1957 | Braunberger | 280/440 |
| 2,856,203 A | * | 10/1958 | Kayler | 280/440 |
| 4,671,526 A | * | 6/1987 | Booher | 280/433 |
| 4,892,324 A | * | 1/1990 | Spencer et al. | 280/440 |
| 5,368,324 A | * | 11/1994 | Kaim | 280/438.1 |
| 5,882,028 A | * | 3/1999 | Osada | 280/439 |
| 6,182,996 B1 | * | 2/2001 | Koetter et al. | 280/433 |
| 6,623,024 B1 | * | 9/2003 | Alguera Gallego et al. | 280/433 |
| 6,644,678 B2 | * | 11/2003 | Strutt et al. | 280/438.1 |

FOREIGN PATENT DOCUMENTS

DE 199 52 997 A1 5/2001

* cited by examiner

Primary Examiner—Lesley D. Morris
Assistant Examiner—Tony Winner
(74) Attorney, Agent, or Firm—Hudak, Shunk & Farine Co., LPA

(57) ABSTRACT

A fifth wheel coupling comprising essentially a fifth wheel plate and a pair of pillow blocks for the attachment on the frame of a truck tractor. The fifth wheel plate pivots around an axis in relation to the pillow blocks and on its underside, is equipped with a pair of hollow cylindrical bearing troughs, while the pillow blocks have corresponding cylindrical bearing surfaces. Below the bearing surface, the pillow block is equipped with an eye for the penetration of an attachment bridge. The object is to reduce the weight of fifth wheel couplings of this type and to lower the manufacturing cost without thereby complicating the assembly or having to omit an adjustment to differing mounting widths. The solution proposes on the one hand, the manufacture of the pillow blocks as one piece from a casting with a vertical mounting flange to permit the direct lateral attachment to longitudinal members of the truck tractor; and on the other hand, the use of bearing shells with side walls of differing thickness, in order to be able to implement a closely stepped, if necessary also continuous adjustment within the framework of a separately specified coarsely stepped adjustment to given mounting widths.

20 Claims, 3 Drawing Sheets

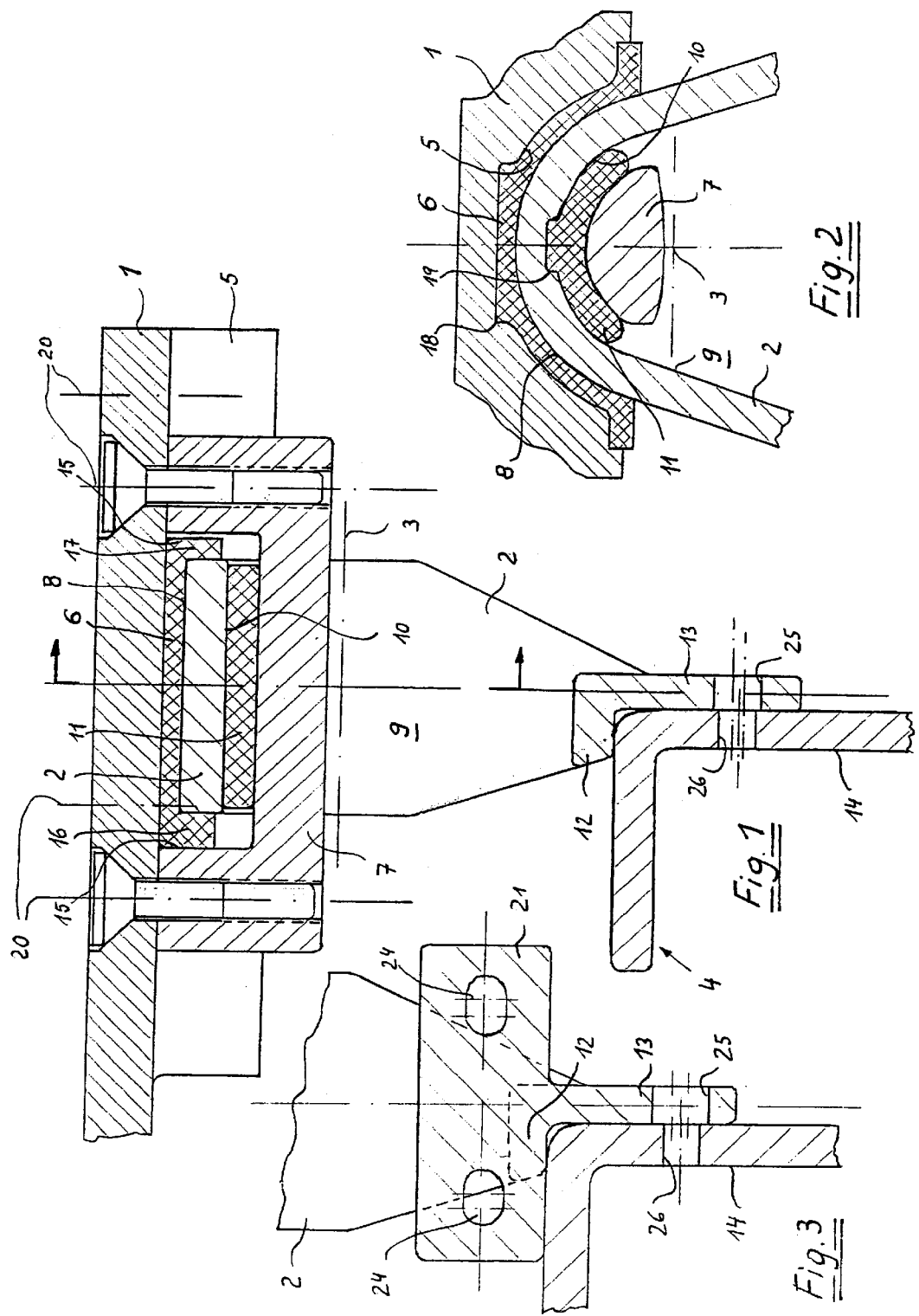

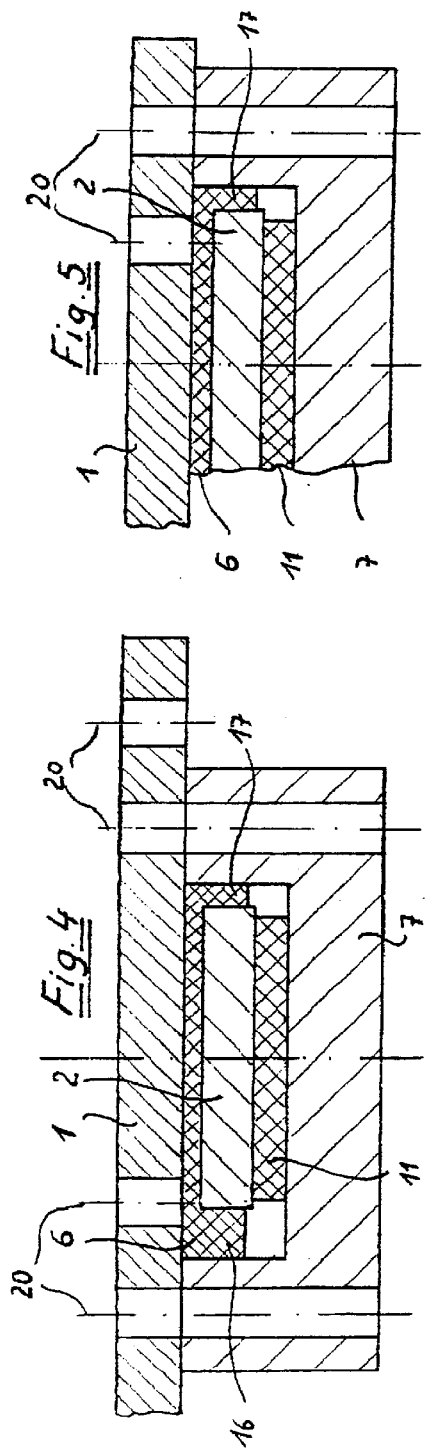
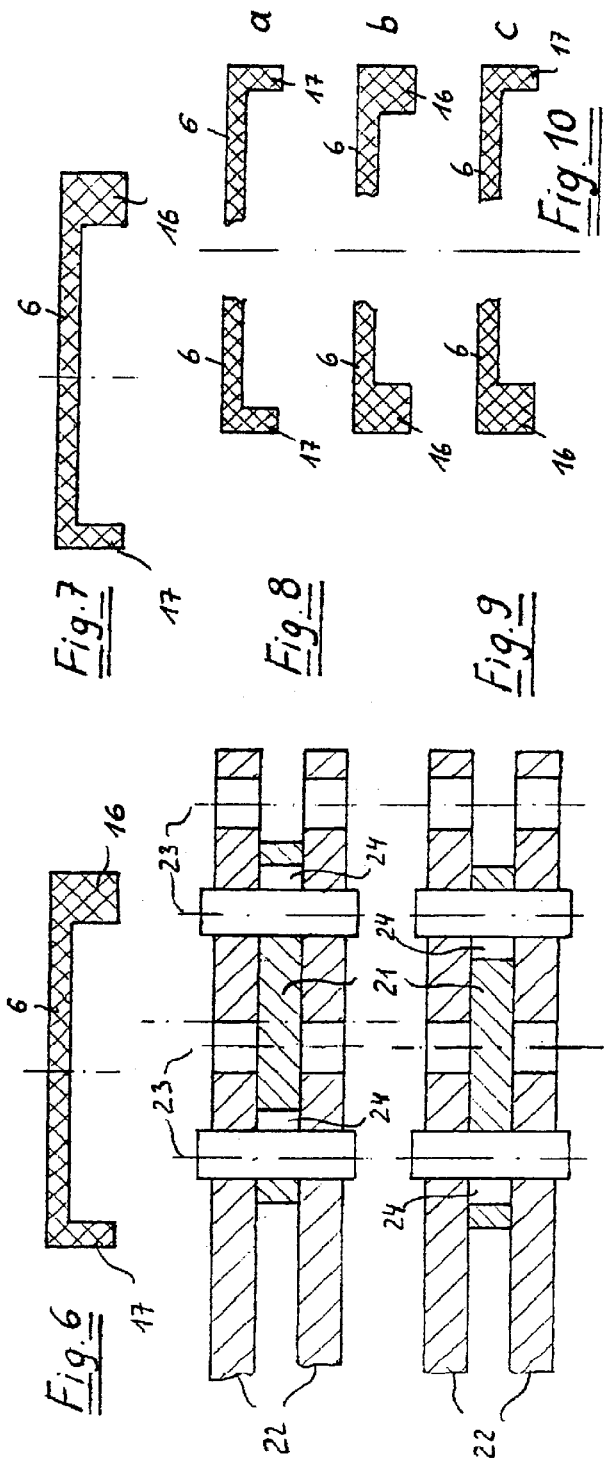

FIFTH WHEEL

FIELD OF THE INVENTION

The invention relates to a fifth wheel coupling for a releasable connection between a semi-trailer and a truck tractor with a fifth wheel plate and a pair of pillow blocks for attaching the fifth wheel coupling to the frame of the truck tractor, wherein the fifth wheel plate is connected to the pillow blocks in such a way that it pivots around an axis running parallel to the foot print of the truck tractor and perpendicular to the longitudinal axis of the truck tractor;

the underside of the fifth wheel plate is equipped with a pair of hollow cylindrical bearing troughs arranged coaxially to the axis, while the pillow blocks have corresponding cylindrical bearing surfaces;

the pillow blocks are equipped with an eye located below the bearing surfaces to allow for fasteners to penetrate the same in the form of a bridge connecting the fifth wheel plate to the pillow blocks in such a way that it swivels around the axis; and a bearing shell is disposed between the bearing trough and the bearing surface, while a damping element is disposed between the bridge and the upper interior wall of the eye.

BACKGROUND OF THE INVENTION

The means formerly used to mount fifth wheel couplings of this kind on the frame of a truck tractor were separate mounting plates which could be adjusted to different lateral distances between the longitudinal members of the frame of the truck tractor and whereon the pillow blocks of the fifth wheel coupling were attached at a firmly specified lateral distance from one another. For some time now, these mounting plates have no longer been used, in order to reduce weight and height. This led to the necessity for designing fifth wheel couplings for differing frame widths. It is true that these only vary within a narrow range because on the one hand, the outer dimensions of the semi-trailers and the truck tractors are limited by law and on the other hand, the tire width is standardized which inevitably leads to an upper limit for the frame width.

The body manufacturers have adapted to this circumstance, and for economic reasons produce the cross braces located between the longitudinal members of the frame in only one length for practical reasons. This results in frames of uniform width if profiles, usually I-profiles, with webs of equal thickness were always used. For price and weight-related reasons, however, light and heavy truck tractors use profiles having the same shape, but differing flange and web thicknesses, and different mounting widths become necessary for the attachment of the fifth wheel couplings, as well.

These components are more complicated and subject to higher stress, therefore they require complex and costly manufacturing processes and can only be produced economically in large quantities with the same dimensions. The object of the invention is therefore to demonstrate possibilities of adjusting uniformly manufactured fifth wheel couplings to frames with differing widths. In this context, various possibilities from the patent application DE 199 52 997 A1 have become known to the art.

In a first solution, two pairs of bores for the attachment of the bridges are provided in the fifth wheel plate, whereby a width adjustment stepped by the axial hole distance becomes possible. A fine adjustment is facilitated when the mounting flanges of the pillow blocks resting on top of the frame are equipped with elongated holes oriented perpendicular to the longitudinal members.

A second solution stipulates a limitation of the bearing troughs by axially spaced contact surfaces. In this case, the axial distance is greater than the width of the pillow block. In order to achieve the step-by-step adjustment to differing frame widths, spacers are provided and inserted between the contact surfaces and the pillow block, said spacers possibly also being constructed as one-piece protrusions formed onto the bridge. This solution, as well, can be combined with elongated holes in horizontal mounting flanges.

In the solution described first, a relatively coarse step-by-step adjustment of the mounting width has to be provided because the distance between the bores cannot be chosen freely, but has a lower limit if the fifth wheel plate is not to become too weak in the area of the bores. This requires correspondingly long elongated holes and correspondingly wide horizontal mounting flanges for the pillow blocks.

In the solution described second, a disadvantage is perceived in the fact that the assembly is complicated by the additional spacers and that assembly errors may occur if "interior" and "exterior" are confused during the insertion of the spacers or if they are not oriented in the same direction. This is also true for the installation of the bridges having protrusions formed onto them on one side.

Another disadvantage of the known fifth wheel coupling lies in the fact that the attachment is achieved with horizontal mounting flanges. In order to be able to vary the configuration of the fifth wheel coupling in the longitudinal direction of the frame, as well, the frame is conventionally equipped with rows of bores which are longer than the rows of bores in the mounting flange of the pillow blocks so that it becomes possible to adjust the point of attachment to various conditions, step by step. However, the upper and lower flanges of the I-shaped longitudinal members have to withstand far more stress than the web in the vicinity of the neutral zone and each bore in the upper flange thus means a weakening of the profile. Said weakness can be simply compensated by using a stronger profile, though this is associated with the disadvantage of an overdimensional profile in the area without holes.

Based on the aforesaid, there is not only the problem of width adjustment, but also the aspect that the advantage of reducing weight by omitting a separate mounting plate is not compensated by overdimensional longitudinal members or may even lead to a weight increase.

SUMMARY OF THE INVENTION

The invention therefore has the object of avoiding or at least diminishing a weakening of the longitudinal members when mounting the fifth wheel coupling on the frame of the truck tractor, and at the same time of providing closely stepped or even better, continuous width adjustment for the pillow block positions on the frame of the truck tractor.

This object is achieved according to the invention by the fact that the pillow blocks comprise a one-piece casting and are equipped with a vertical mounting flange for the direct lateral attachment to the longitudinal members of the frame of the truck tractor;

the bridges are equipped with cylindrical fitting surfaces matched to the hollow cylindrical bearing troughs, and—viewed on a longitudinal section—are constructed to be U-shaped and open on top, and have internal contact surfaces oriented perpendicular to the axis with an axial distance greater than the width of the pillow block in the area encircled by the bridge;

the bearing shells—viewed on a longitudinal section—are constructed to be U-shaped and open at the bottom and have side walls with internal and external contact surfaces essentially vertical to the axis, wherein the distance of the external contact surfaces is adapted to the distance between the contact surfaces of the bridge, while the distance of the internal contact surfaces is adapted to the width of the pillow block in the encircled area;

and that viewed in the direction of the axis, the side walls are constructed with differing thicknesses to facilitate continuous adjustment to a given assembly width.

The direct attachment of the vertical mounting flanges of the pillow blocks to the web of the I-profiles of the longitudinal members makes it possible to omit the bores in the upper flange of the profiles and ensures that the profile is not weakened in this high-stress area. Therefore, it will not be necessary to provide longitudinal members that can withstand stress in the area with holes, and would necessarily be overdimensioned and thus unnecessarily heavy.

The use of vertical mounting flanges, however, excludes the provision of elongated holes for a step-by-step adjustment to differing frame widths. The known step-by-step adjustments, as for example by means of pairs of bores in the fifth wheel plate, can continue to be used. The required closely stepped or continuous adjustment is achieved according to the invention by the fact that the bridges are constructed as U-shaped with axially spaced contact surfaces and that—viewed on a longitudinal section—U-shaped bearing shells are used wherein the axially limiting side walls can be constructed with differing thicknesses. If required, the appropriate coarsely stepped adjustment is provided for a given mounting width and then the thickness of the side walls of the bearing shells is determined in a way to obtain the still missing closely stepped adjustment.

In this context, it may be assumed that bearing shells will be used wherein the axial distance of the external contact surfaces of the side walls is adapted to the axial distance of the internal contact surfaces of the bridge and that the axial distance of the internal contact surfaces of the side walls is smaller than the width of the pillow block in the area encircled by the bridge. By machining with cutting tools, the axial distance of the internal contact surfaces is then enlarged as necessary by removing material either only on the external side wall, only on the internal side wall, or on both side walls, depending on the specified position of the pillow blocks. This is not particularly complicated or costly, because each bearing shell needs to be clamped only once on the lathe which can remove the material quickly and precisely, particularly from bearing shells manufactured of synthetic materials. Furthermore, this type of work is only necessary in isolated cases for the adjustment to a very unusual frame width. In most cases, the width will be more or less "standardized" where only manufacturing tolerances will have to be evened out. It is then possible to assume the use of pre-fabricated bearing shells with side walls of fixed thickness and make use of the possibility of an installation with a rotation by 180° which permits implementation of three different mounting widths in each case.

It is therefore possible to cover the entire range between two coarsely adjustable mounting widths with only few types of thickness differences in the side walls by such closely stepped adjustment that the above described individual adjustment by means of removing material is not necessary.

BRIEF DESCRIPTION OF THE DRAWINGS

The claims describe advantageous embodiments and refinements of the inventive idea. Further details are explained with reference to embodiments represented in FIGS. 1 through 11. The figures show:

FIG. 1: one part of a fifth wheel coupling according to the invention in a longitudinal section;

FIG. 2: one part of the fifth wheel coupling according to FIG. 1 in a sectional view;

FIG. 3: the detail of a refinement of the fifth wheel coupling according to FIG. 1 in a longitudinal section.

FIGS. 4 and 5: in detail, the possibility of the coarsely stepped width adjustment by means of pairs of bores in the fifth wheel plate;

FIGS. 6 and 7: the position of the bearing shells of FIGS. 4 and 5 installed with a rotation of 180°;

FIGS. 8 and 9: the width adjustment in the area of the cross braces;

FIG. 10: the three embodiments possible with a pair of bearing shells; and

DETAILED DESCRIPTION OF THE INVENTION

Figure 11:
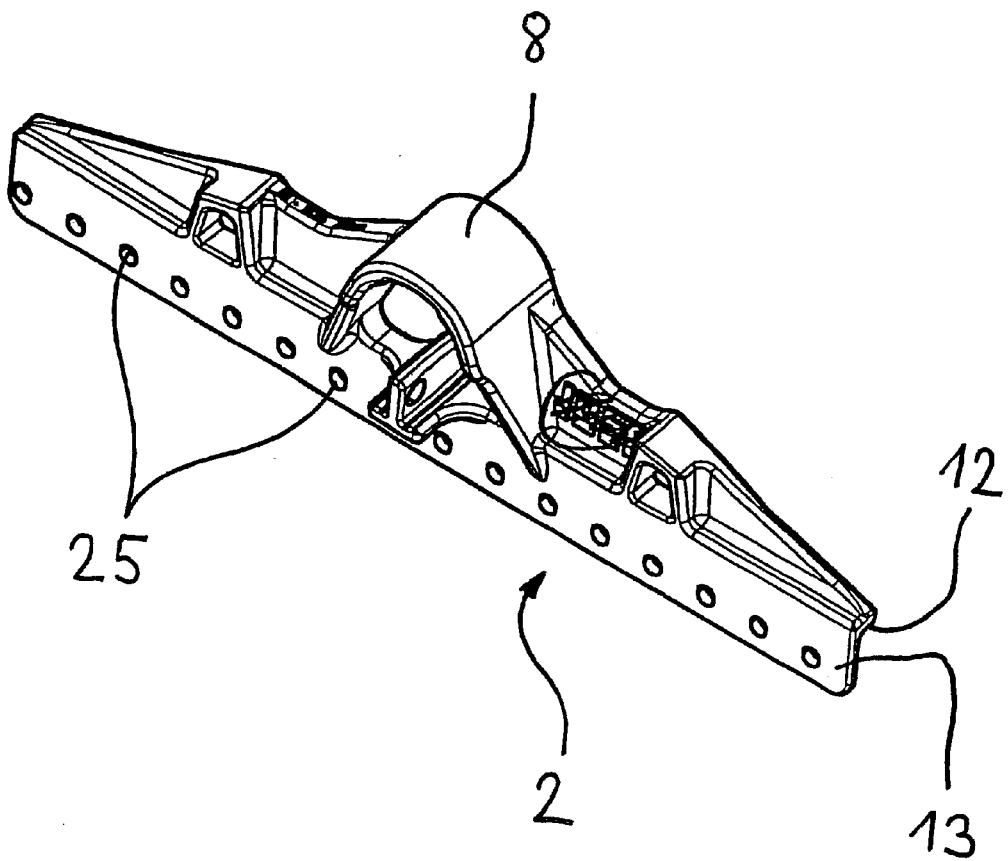
FIG. 11: a pillow block according to the invention in perspective view.

The representation in FIG. 1 corresponds to a longitudinal section through the mounting point on the plane of axis 3 around which the fifth wheel plate 1 can pivot in relation to the pillow block 2. A number 4 designates the right part of the frame as viewed in direction of travel comprising a longitudinal member 14 with I-profile. A row of bores 26, 25 is provided in the longitudinal member 14 as well as in the vertical mounting flange 13 of the pillow block 2 to serve the attachment of the pillow block 2 to the external side wall of the longitudinal member 14 by means of screws. The pillow block 2 is equipped, in addition, with a short horizontal mounting flange 12 which facilitates determination of the vertical position of the pillow block 2 in relation to the longitudinal member 14 and via which the bearing forces are transmitted directly from the pillow block 2 to the longitudinal member 14.

The underside of the bearing plate 1 is equipped with a hollow cylindrical bearing trough 5 oriented coaxially to the axis 3 and having a cross section as shown in FIG. 2. In the bearing trough 5 a bearing shell 6 is installed wherein the side walls 16, 17 are constructed with different thicknesses.

The side walls encircle the upper part of the pillow block 2 and in turn rest against the internal walls 15 of the U-shaped—as viewed on a longitudinal section—bridge 7. The bridge 7 penetrates through the eye 9 of the pillow block and is attached to the bearing plate 1 by means of screws. A damping element 11 is disposed between the bridge 7 and the internal surface 10 of the eye 9. The center lines 20 indicate not only the bores in the bearing plate 1 used in FIG. 1 for attaching the bridge 7, but also the positions of an axially offset pair of bores which is provided for coarsely stepped positioning of the pillow blocks 2 in relation to the fifth wheel plate 1.

FIG. 2 shows the cross sections of the bearing shell 6 and the damping element 11. Both components are secured against a rotational relative motion by protrusions 18, 19 as well as the corresponding indentations in the bearing trough 5 of the bearing plate 1 or in the internal wall 10 of the eye 9, respectively. When the bearing plate 1 pivots in relation to the pillow block 2 around the axis 3, a sliding relative motion occurs between the bearing surface 8 of the pillow block 2 on the one hand, and between the damping element 11 and the surface of the bridge 7, on the other hand.

The segment in FIG. 3 representing the modification of the pillow block according to FIG. 1 shows a sectional view of a stop 21 oriented parallel to the axis 3, serving for the attachment of a cross brace (see FIGS. 8 and 9), and which is equipped with elongated holes 24. In this manner, another cross brace 22 (see FIGS. 8 and 9) can be placed between the two pillow blocks of a fifth wheel coupling, if the rigidity of the frame 4 is considered as insufficient after the omission of the mounting plate which conventionally was used in the area of the attachment of the pillow blocks 2. The attachment of the pillow block 2 to the longitudinal member 14 of the frame 4 and the reference numbers 12, 13, 25, and 26 in FIG. 3 correspond to those in FIG. 1 and do not have to be explained again.

FIGS. 4 and 5 are segments from FIG. 1 and show the alternative use of the bores 20. In FIG. 4, the bridge 7 is assigned to the internal pair of bores, while FIG. 5, in contrast, shows the bridge 7 as disposed outwardly offset by the bore distance. In this manner, as was said before, a coarsely stepped width positioning of the pillow blocks 2 in relation to the fifth wheel plate 1 can be achieved, and thereby an initial approximation to a given mounting width of the frame 4 of the truck tractor.

FIGS. 6 and 7 show simplified views of the amount by which the center lines of the pillow block 2 would be displaced in comparison to FIGS. 4 and 5, if the bearing shell 6 in FIGS. 4 and 5 were installed with a rotation of 180°. It is understood that the distance between the bores 20 and the closely stepped adjustment range facilitated by the thickness differences of the side walls 16 and 17 have to be matched in such a way that a given variation range is completely covered.

The same principle of width adaptation is also applied to the cross braces 22, if so equipped. The one-piece stops 21 formed onto the pillow blocks 2 are equipped with elongated holes 24, while the cross braces 22 have pairs of bores 23 offset in longitudinal direction which can be used if desired. In FIGS. 8 and 9, the respective internal pairs of bores are used; with the extreme left area of the elongated hole 24 being used in FIG. 8, while the extreme right area of the elongated hole 24 is used in FIG. 9. Here again, the distance between the bores 23 and the length of the elongated holes 24 is, of course, matched in such a way that the entire variation range is covered.

FIG. 10 shows in schematic representation the three possibilities offered by using a pair of bearing shells with certain thickness differences in the side walls 16 and 17. In FIG. 10a, the two thin side walls 17 are on the outside, i.e. the pillow blocks 2 are located as far apart as possible. In figure 10b, the two thick side walls 16 are disposed on the outside, which means that the pillow blocks 2 have the smallest axial distance possible. Finally, FIG. 10c shows on the left the thick side wall on the outside, while on the right, the thin side wall is located on the outside. In this case, the axial distance between the two pillow blocks 2 is exactly between that shown in FIG. 10a and that of FIG. 10b. The latter variant does lead to a slightly asymmetrical configuration of the fifth wheel coupling on the truck tractor, but this would be easily tolerable because the asymmetry would be at a maximum in the range of 1 or 2 mm and therefore—in comparison to the dimensional tolerances existing for truck tractors and semi-trailers as a whole—may be neglected.

FIG. 11 shows a perspective view of a pillow block according to the invention to serve as complement to the sectional views of segments in FIGS. 1 through 10. The reference numbers have the same meaning as in the figures described above and will not be explained here again.

What is claimed is:

1. A fifth wheel coupling for a releasable connection between a semi-trailer and a truck tractor comprising:

a fifth wheel plate and a pair of pillow blocks adapted for attaching a fifth wheel coupling to the frame of the truck tractor, wherein the fifth wheel plate is connected to the pillow blocks in such a way that the wheel plate pivots around an axis adapted to run parallel to the foot print of the truck tractor and perpendicular to the longitudinal axis of the truck tractor;

wherein an underside of the fifth wheel plate is equipped with a pair of hollow cylindrical bearing troughs arranged coaxially to the axis, and the pillow blocks have corresponding cylindrical bearing surfaces;

wherein the pillow blocks are equipped with an eye located below the bearing surfaces to allow for fasteners to penetrate and form a bridge connecting the fifth wheel plate to the pillow blocks in such a way that the wheel plate swivels around the axis;

wherein a bearing shell is disposed between a bearing trough and the bearing surface, while a damping element is disposed between the bridge and an upper interior wall of the eye;

wherein the pillow blocks comprise a one-piece casting and are equipped with a vertical mounting flange adapted for a direct lateral attachment to a longitudinal members of the frame of the truck tractor;

wherein bridges are equipped with cylindrical fitting surfaces matched to the hollow cylindrical bearing troughs are constructed to be U-shaped and open on top, while having internal contact surfaces disposed essentially perpendicular with respect to the axis and having an axial distance greater than a width of the pillow block in the area encircled by the bridge;

wherein the bearing shells are constructed to be U-shaped and open at the bottom and equipped with side walls having internal and external contact surfaces perpendicular to the axis, wherein a distance between the external contact surfaces is adapted to be less than or equal to the distance between the contact surfaces of the bridge and the distance between the internal contact surfaces is adapted to be greater than or equal to the width of the pillow block in the encircled area; and wherein the side walls are constructed with differing thicknesses for the purpose of adjustment to a given mounting width.

2. A fifth wheel coupling according to claim 1, wherein the bearing shells are manufactured of a suitable synthetic material.

3. A fifth wheel coupling according to claim 1, wherein the bearing shells can also be installed with a rotation of 180° so that a three-step adjustment to the mounting width is possible for side walls with a given thickness difference.

4. A fifth wheel coupling according to claim 1, wherein pairs of bearing shells with side walls with different thickness variations are used.

5. A fifth wheel coupling according to claim 1, wherein the bridges are attached to the fifth wheel plate by means of bolts and that two pairs of bores are provided in the fifth wheel plate in a manner known as such for the purpose of a coarsely stepped width adaptation.

6. A fifth wheel coupling according to claim 1, wherein a stop is provided which is disposed parallel to the pivoting axis and through the eyes and is formed in one piece onto each of the pillow blocks for the purpose of the attachment of a cross brace.

7. A fifth wheel coupling according to claim 6, wherein the cross brace is equipped with pairs of bores with distances corresponding to those of the pairs of bores in the fifth wheel plate, and that elongated holes are provided in the stops to cover the tolerance range offered by the differing thicknesses of the side walls of the bearing shells.

8. A fifth wheel coupling according to claim 1, wherein the mounting flanges of the pillow blocks and the longitudinal members of the truck tractors are provided with rows of equidistant bores facilitating in the manner known to the art as a coarsely stepped modification of the longitudinal configuration of the fifth wheel coupling on the frame of the truck tractor.

9. A fifth wheel according to claim 8, wherein the row of bores in the pillow block is disposed symmetrically to the pivoting axis so that the pillow blocks can be used to the right or the left, as desired, to allow adjustment to a given mounting width and adapted so that only one casting mold is required for manufacture.

10. A fifth wheel coupling according to claim 8, wherein the row of bores in the pillow block is disposed asymmetrically to the pivoting axis so that a right/left exchange when using separately manufactured right/left pillow blocks offers not only the possibility of adjustment to a given mounting width, but also that of a closely stepped adjustment for the longitudinal configuration.

11. A fifth wheel coupling according to claim 1, the pillow blocks are equipped, in addition, with a one-piece horizontal bearing flange formed onto the same.

12. A fifth wheel coupling according to claim 1, wherein the bearing shells and the damping elements are equipped with protrusions in a longitudinal direction of the axis, while the opposite walls of the fifth wheel plate and the eye of the pillow block have corresponding indentations to provide a secure form-fitting protection of a rotational installation of the bearing shells and/or the damping element.

13. A fifth wheel coupling according to claim 2, wherein the bearing shells can also be installed with a rotation of 180 degrees so that a three-step adjustment to the mounting width is possible for side walls with a given thickness difference.

14. A fifth wheel coupling according to claim 13, wherein pairs of bearing shells with sidewalls with different thickness variations are used.

15. A fifth wheel coupling according to claim 14, wherein the bridges are attached to the fifth wheel plate by means of bolts and that two pairs of bores are provided in the fifth wheel plate in a manner known as such for the purpose of a coarsely stepped width adaptation.

16. A fifth wheel coupling according to claim 15, wherein a stop is provided which is disposed parallel to the pivoting axis and through the eyes and is formed in one piece onto each of the pillow blocks for the purpose of the attachment of a cross brace.

17. A fifth wheel coupling according to claim 16, the cross brace is equipped with pairs of bores with distances corresponding to those of the pairs of bores in the fifth wheel plate, and that elongated holes are provided in the stops to cover the tolerance range offered by the differing thicknesses of the sidewalls of the bearing shells.

18. A fifth wheel coupling according to claim 17, the mounting flanges of the pillow blocks and the longitudinal members of the truck tractors are provided with rows of equidistant bores facilitating in the manner known to the art as a coarsely stepped modification of the longitudinal configuration of the fifth wheel coupling on the frame of the truck tractor.

19. A fifth wheel according to claim 18, wherein a) the row of bores in the pillow block is disposed symmetrically to the pivoting axis so that the pillow blocks can be used to the right or the left, as desired, to allow adjustment to a given mounting width and adapted so that only one casting mold is required for their manufacture, or b) the row of bores in the pillow block is disposed asymmetrically to the pivoting axis so that a right/left exchange when using separately manufactured right/left pillow blocks offers not only the possibility of adjustment to a given mounting width, but also that of a closely stepped adjustment for the longitudinal configuration.

20. A fifth wheel coupling according to claim 19, the pillow blocks are equipped, in addition, with a one-piece horizontal bearing flange formed onto the same, and wherein the bearing shells and the damping elements are equipped with protrusions in longitudinal direction of the axis, while the opposite walls of the fifth wheel plate and the eye of the pillow block have corresponding indentations to provide a secure form-fitting protection of a rotational installation of the bearing shells and or the damping element.

\* \* \* \* \*